United States Patent
Keohane et al.

(10) Patent No.: US 7,506,023 B2
(45) Date of Patent: Mar. 17, 2009

(54) APPARATUS, SYSTEM AND METHOD OF RELATING TIME SET ON ONE COMPUTER SYSTEM TO TIME SET ON ANOTHER COMPUTER SYSTEM

(75) Inventors: Susann Marie Keohane, Austin, TX (US); Gerald Francis McBrearty, Austin, TX (US); Shawn Patrick Mullen, Buda, TX (US); Jessica Kelley Murillo, Hutto, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 807 days.

(21) Appl. No.: 10/171,845

(22) Filed: Jun. 13, 2002

(65) Prior Publication Data
US 2003/0233479 A1 Dec. 18, 2003

(51) Int. Cl.
*G06F 15/16* (2006.01)
*G06F 12/00* (2006.01)
*G06F 17/30* (2006.01)

(52) U.S. Cl. .................... 709/203; 709/204; 709/205; 707/201; 707/203

(58) Field of Classification Search .............. 375/356; 713/375; 709/223, 248, 203–205; 707/8, 707/201, 203
See application file for complete search history.

(56) References Cited

U.S. PATENT DOCUMENTS

| | | | | |
|---|---|---|---|---|
| 4,894,846 A * | 1/1990 | Fine | ............................ | 375/356 |
| 5,471,631 A * | 11/1995 | Beardsley et al. | ........... | 713/502 |
| 5,602,933 A * | 2/1997 | Blackwell et al. | ............ | 382/116 |
| 5,918,040 A * | 6/1999 | Jarvis | .......................... | 713/375 |
| 5,924,094 A * | 7/1999 | Sutter | ........................... | 707/10 |
| 6,085,221 A * | 7/2000 | Graf | ............................. | 709/202 |
| 6,260,040 B1 * | 7/2001 | Kauffman et al. | ............. | 707/10 |
| 6,516,339 B1 * | 2/2003 | Potts et al. | ................... | 709/203 |
| 6,754,657 B2 * | 6/2004 | Lomet | ............................ | 707/8 |
| 6,938,045 B2 * | 8/2005 | Li et al. | ........................ | 707/100 |
| 7,043,651 B2 * | 5/2006 | Aweya et al. | ................. | 713/400 |
| 2003/0140050 A1 * | 7/2003 | Li et al. | ........................ | 707/100 |
| 2006/0212711 A1 * | 9/2006 | Tanimoto | ..................... | 713/178 |

OTHER PUBLICATIONS

Mils. D.L., "Internet Time Synchronization:-rhe Network Time Protocol",IEEE Transactions On Communications. vol. 39,No. 10, 1991, pp. 1482-1493;(retrieved on Jul. 28, 2005 IEEE Database).*

* cited by examiner

*Primary Examiner*—Ario Etienne
*Assistant Examiner*—Philip J Chea
(74) *Attorney, Agent, or Firm*—Volet Emile; Diana L. Gerhardt; Mark E. McBurney

(57) ABSTRACT

A system, apparatus and method that relate a real-time clock of a first computer system to a real-time clock of a second computer system are provided. When the first computer system is using files created by the second computer system, it requests that the second computer provides its current local time. The first computer records the time of the request, the time the response to the request is received as well as the requested current local time. Using these different recorded times, the first computer is able to compute a time difference (if any) between its real-time clock and the real-time clock of the second computer system.

12 Claims, 5 Drawing Sheets

|  | TIMESTAMPS |
| :---: | :---: |
| TIME OF REQUEST | 1020459173 |
| TIME OF RESPONSE | 1020459450 |
| TIME RESPONSE SENT | 1020459412 |

FIG. 5

APPARATUS, SYSTEM AND METHOD OF RELATING TIME SET ON ONE COMPUTER SYSTEM TO TIME SET ON ANOTHER COMPUTER SYSTEM

BACKGROUND OF THE INVENTION

1. Technical Field

The present invention is directed to network computing. More specifically, the present invention is directed to a method, system and apparatus for relating time set on one computer system to time set on another computer system on a network.

2. Description of Related Art

Most computer systems have a real-time clock. Real-time clocks are clocks that run on a battery and thus, are able to keep track of time even when the computer systems are turned off or disconnected. As with regular clocks, real-time clocks may be fast, slow, set ahead or behind local time etc.

Real-time clocks are used to indicate current date and time of day. In addition, the clocks are used to timestamp files. To timestamp a file is to indicate in the file the date and time the file was created. This allows users to determine which files are the most recent in a group of files. This feature can be rather important, especially, in this day and age of network programming.

Network programming allows programmers located anywhere in the world to collaborate in writing a software program. The programmers may be working on different files or on the same files. The files can then be compiled and linked to each other to be converted into the software program.

Recently, different tools have been made available to facilitate network programming. One of these tools is the network file system (NFS). NFS is a client-server application that allows network users to access shared files stored on computer systems of different types. Users can manipulate shared files as if they were stored locally (i.e., on the users' own hard disk). With NFS, computer systems connected to a network operate as clients when accessing remote files and as servers when providing remote users access to local shared files. The NFS standards are publicly available and widely used.

Thus, a user may work on remote files as well as local files. But, when a file is created remotely, the real-time clock running on the remote computer system is used to timestamp the file. Likewise, if a file is created locally, the real-time clock of the local computer system is used to timestamp the file. Thus, as mentioned above, being able to relate different real-time clocks to each other in order to determine which files are the most recent becomes quite necessary.

Furthermore, some compilers are designed to automatically compile files. These compilers use file timestamps to determine which files to compile. As an illustration, suppose a program is written in the C language, the program will have ".C" extension. If the program is compiled, there will be a corresponding object file with ".O" extension. If the program is supposed to work with other files or use library files etc., all the files will have to be linked to each other in order to form an ".EXE" file. Note that in DOS or WINDOWS operating systems, the executable file has an ".EXE" extension. However, in UNIX, the executable file does not have an extension.

In any event, all the files (i.e., ".C", ".O" ",EXE" etc.) will have a timestamp. If a user modifies the ".C" file, the file will have to be recompiled. Presently, some compilers compare timestamps of ".O" files to those of corresponding ".C" files to determine whether the ".C" files need to be compiled. If a ".C" file has a timestamp that is more recent than a corresponding ".O" file, then the ".C" file must have been created after the ".O" file and thus, has not yet been compiled. Hence, the compiler will automatically compile the ".C" file.

When the ".O" and the ".C" files are on different computer systems and the real-time clock of the computer system on which the ".C" file resides is slower, on a different time zone (i.e., time zone behind that of the other computer system) or for some reason is set behind the other computer system's real-time clock, the compiler may not determine that the ".C" file has not been compiled yet.

Therefore, there is a need for an apparatus, system and method of relating one real-time clock to another to determine which files are the most recent files.

SUMMARY OF THE INVENTION

The present invention provides a system, apparatus and method that relate a real-time clock of a first computer system to a real-time clock of a second computer system. When the first computer system is using files created by the second computer system, it requests that the second computer provides its current local time. The first computer records the time of the request, the time the response to the request is received as well as the requested current local time. Using these different recorded times, the first computer is able to compute a time difference (if any) between its real-time clock and the real-time clock of the second computer system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is depicts a table in which are recorded time readings.

DETAILED DESCRIPTION OF THE PREFERRED EMBODIMENT

Figure 1:
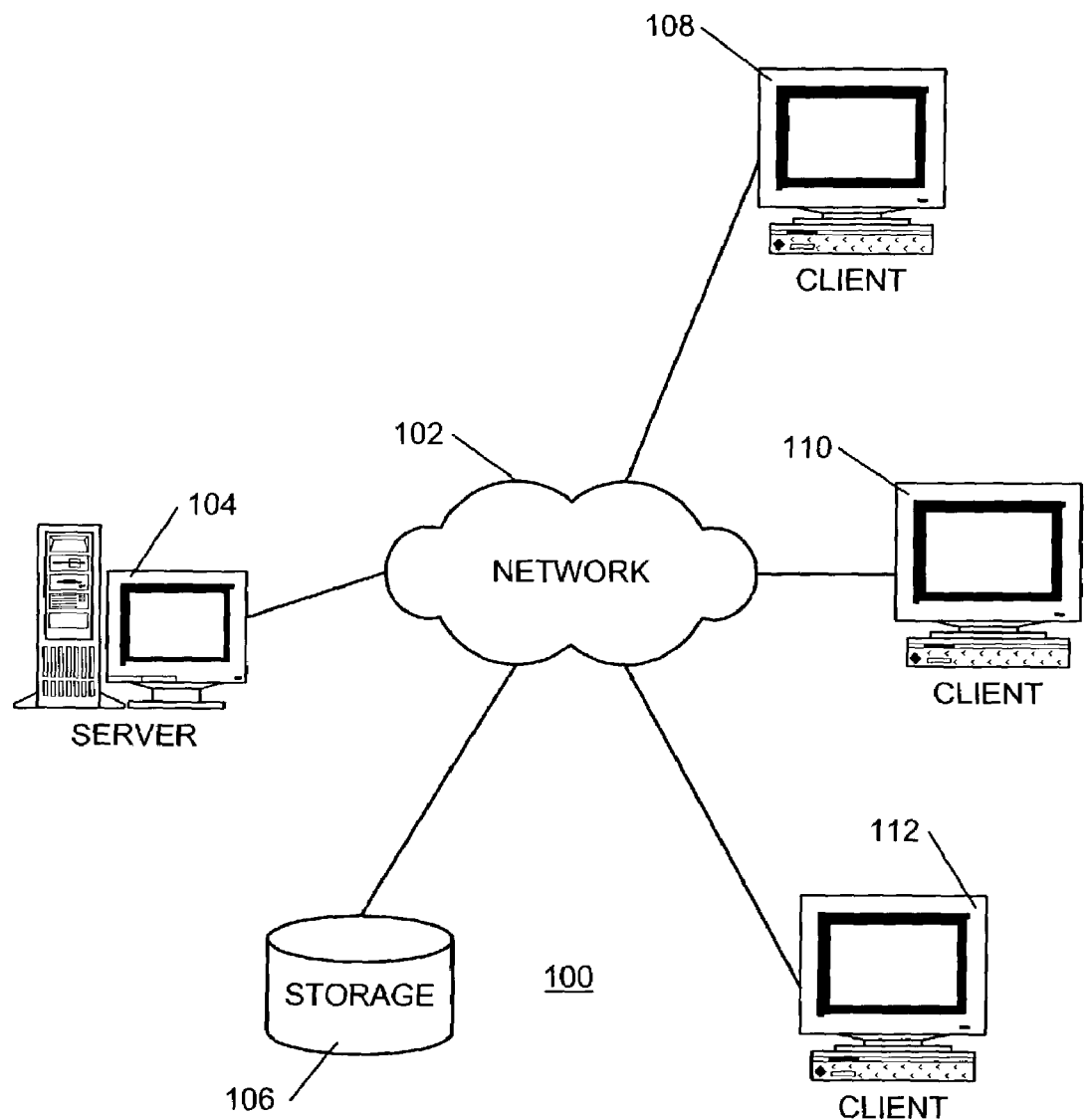
FIG. 1 is an exemplary block diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
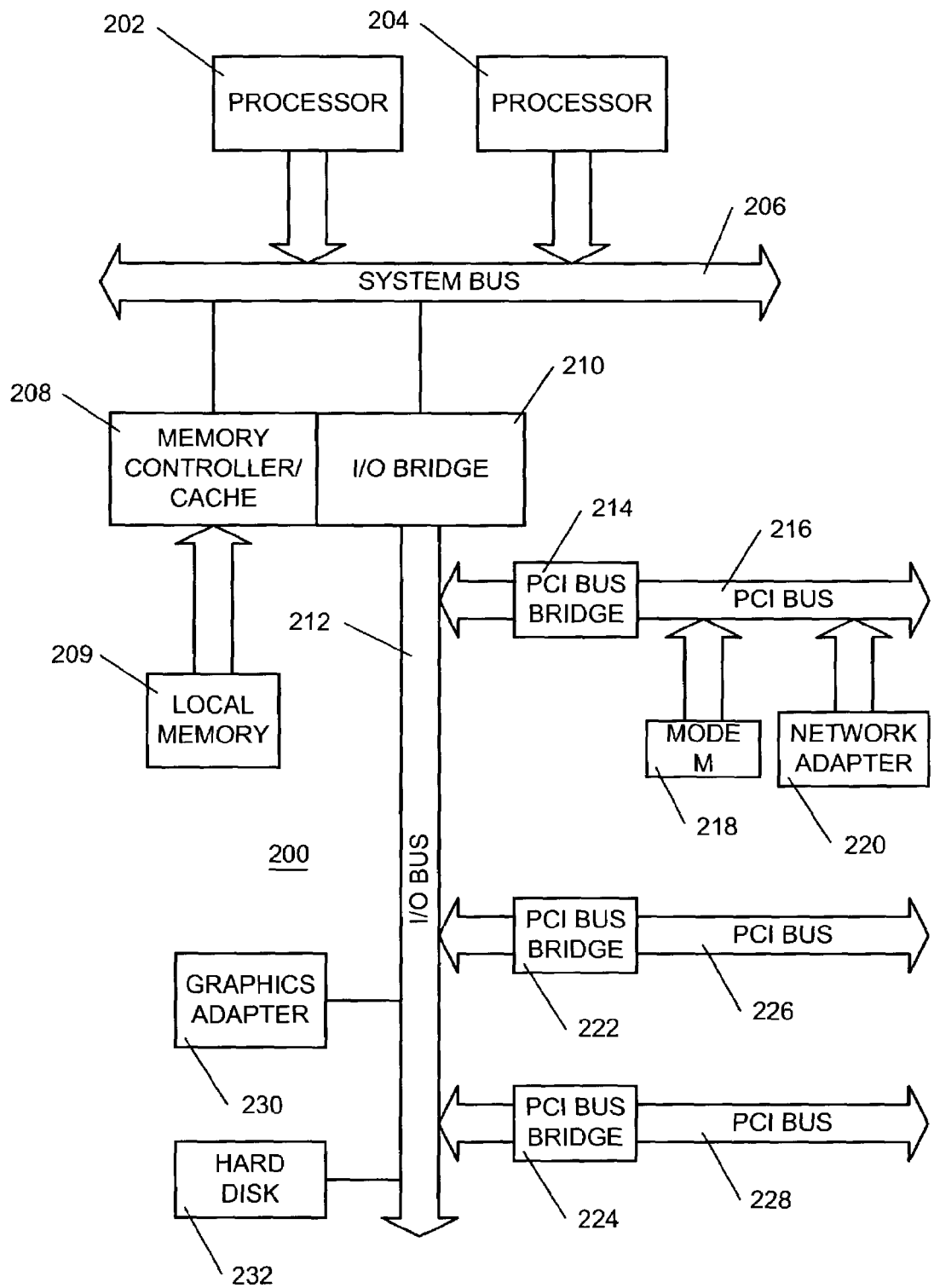
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
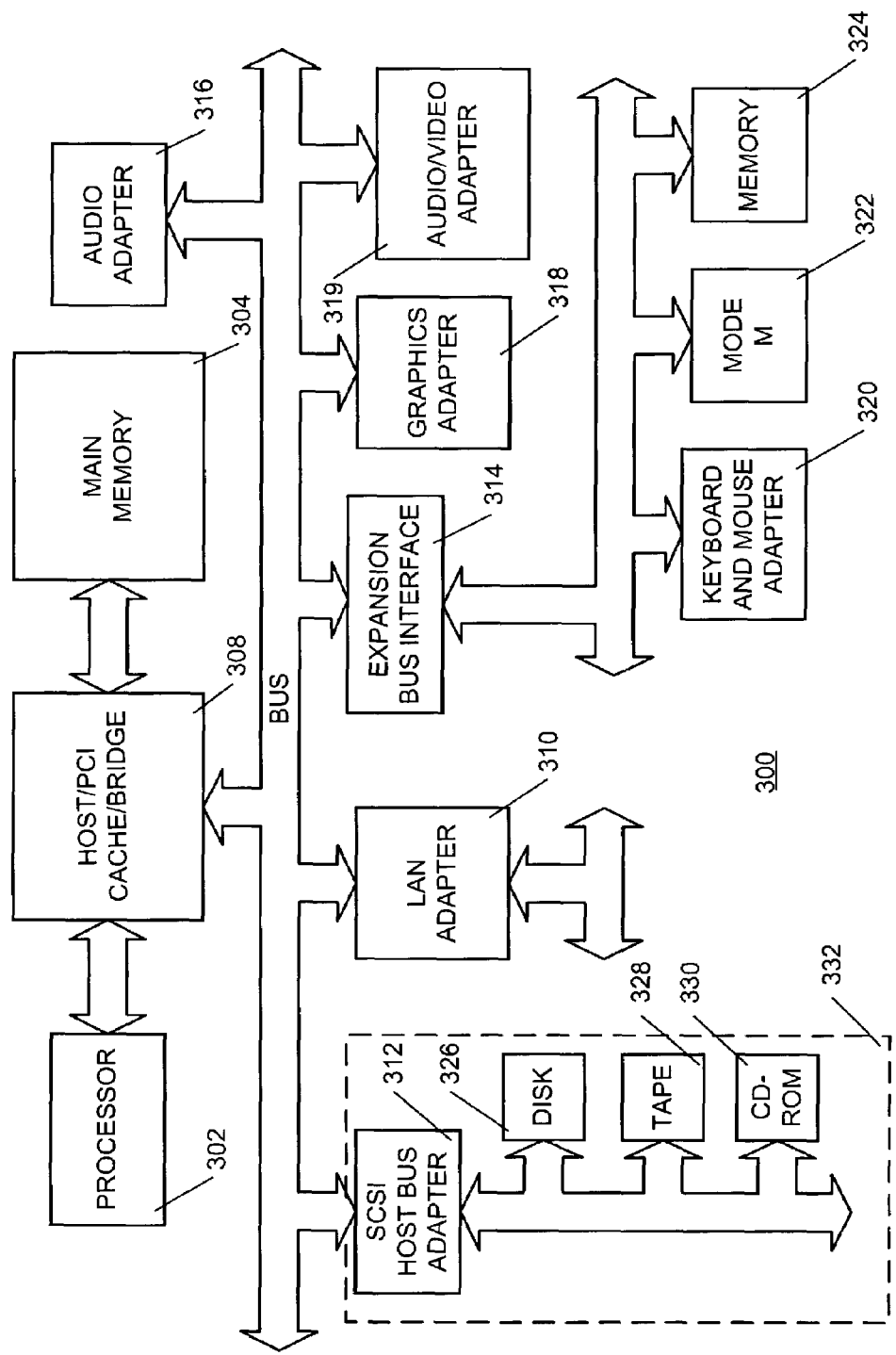
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer in addition to taking the form of a PDA. Data processing system 300 also may be a kiosk or a Web appliance.

The present invention is a mechanism that may be used to correlate time set on a first computer system to time set on a second computer system. The invention may be local to server 104 or to client systems 108, 110 and 112 of FIG. 1 or to both the server 104 and clients 108, 110 and 112 so long as the clients are not diskless. Further, the present invention may reside on any data storage medium (i.e., floppy disk, compact disk, hard disk, ROM, RAM, etc.) used by a computer system.

Timestamps are typically a long hexadecimal number that represents a number of seconds added to a base time or an Epoch. UNIX and Windows NT operating systems use Jan. 1, 1970 GMT as an Epoch whereas Mackintosh computer systems use Jan. 1, 1904 GMT as the Epoch. As an illustration, 1020459173 in UNIX Epoch is equivalent to Friday May 3, 04:52 pm EST, day 122 of 2002. Thus, if a UNIX file were created at that precise moment in time, 1020459173 would be used as its timestamp.

The present invention will be explained using NFS as a network programming tool. However, any tool facilitating network programming may be used. Consequently, the invention is not restricted to only NFS. Any network programming tool is well within the scope and spirit of the invention.

In NFS, before a file system can be accessible to a computer system, the file system has to be mounted on the system. Mounting a file system establishes, among other aspects, a pathname to the file system or to any directory or file in the file system. Thus, in order for a client system to access a file remotely, the file system within which the file is located must be mounted on the remote computer system (i.e., the server) as well as on the client. If the file system is not mounted on the server, the client must first request that the server mount the file system.

In any case, when the client system mounts a file system that resides on a server, the client system may send a timestamped request for the server to return a timestamped acknowledgement as well as the Epoch the server is using. The returned Epoch will let the client know whether the server is using the same Epoch as it is. When the server's response is received, it is also timestamped. All the different timestamps are entered into a table. The client may then determine whether there is a time difference or delta between its local time and that of the server. If there is a time difference the difference will be applied accordingly when timestamping files.

To determine whether there is a time difference between its local time and the server's local time, the client first looks at the returned Epoch to ensure that the server is using the same Epoch as it is. If not, the appropriate difference will be calculated (i.e., Jan. 1, 1970 GMT vs. January a 1904 GMT). Then, the client takes the difference between the time the request was sent to the server and the time the response from the server was received. This difference is then divided by two (2) to get an average time between sending and receiving data from the server. This difference is added or subtracted from the server time each time the client is storing file on the server. That is, when a file is created remotely (i.e., when a client system creates a file on a server) the time difference may be taken into account in order to convert the client local time to the server's local time. This then may allow the file being stored on the server to have a timestamp that is derived from the server's real-time clock instead of from the real-time clock of the client.

Furthermore, the invention may be implemented such that each time a client mounts a file system on a particular server, the client requests that the server return a timestamped acknowledgement for subsequent comparisons between time kept by the client's real-time clock and the server's real-time clock. Alternatively, a timestamped request may be sent out only once, when the first file system is mounted.

Returning to the invention, since requesting and recording the time will consume processing time as well as storage space, it is preferable that the invention be an option. Thus, when a user is requesting that a server's file system be mounted, the user may turn the option on by using a flag such as "-relative". For example, the following command may mount file system "/shared/work" on server Austin.ibm.com as well as turn the option on:

mount -relative -n server.Austin.ibm.com:/shared/work/home/my_work.

Figure 4:
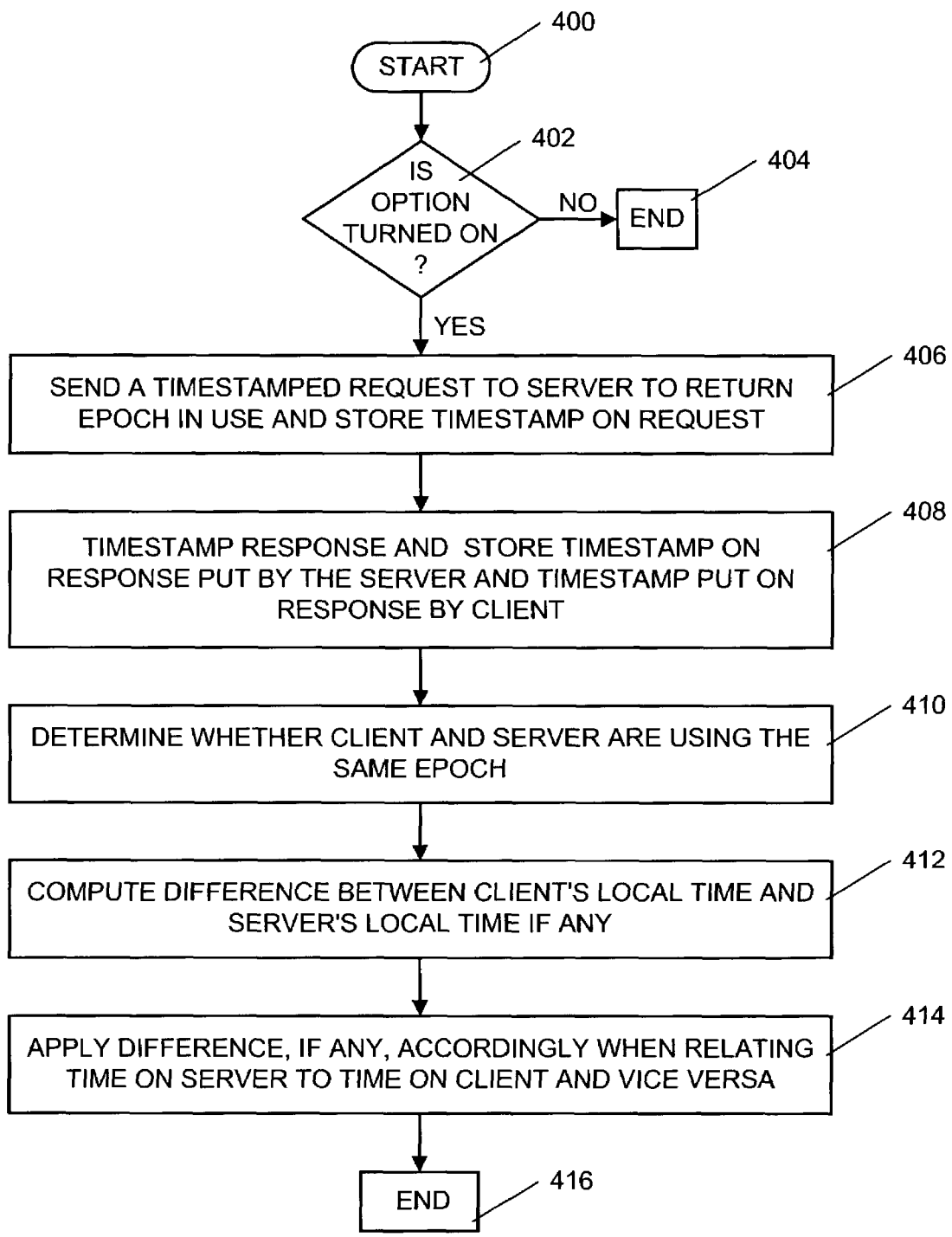
FIG. 4 is a flow chart of a process that may be used when implementing the invention.

FIG. 4 is a flow chart of a process that may be used when implementing the invention. The process starts when a client requests that a server mount a file system. Then a check is made to determine whether the option is set. If the option is not set the process ends steps 400-404). If the option is set, then the client will send a timestamped request to the server to respond with a timestamped acknowledgement as well as the Epoch in use. When the response is received from the server, the client may then timestamp the response. All the time stamps are entered into a table (see FIG. 5). Using the different timestamps recorded in the table, the client may compute a difference that can be used to relate its local time to the local time of the server and the process ends (steps 406-416).

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of relating a local time of a first computer system to a local time of a second computer system in order to timestamp files created or modified by the first computer system that are to be stored on the second computer system using the local time of the second computer system, the method comprising:

requesting by said first computer system that said second computer system provide the local time at the second location;

receiving by said first computer system the returned local time provided by said second computer system;

determining whether there is a difference between the local time of the first computer system and the local time of the second computer system;

calculating the difference between the local time of the first computer system and the local time of the second computer system in response to determining that there is a difference between the local time of the first computer system and the local time of the second computer system wherein calculating the difference between the local time of the first computer system and the local time of the second computer system includes computing a time delta between the local time of the first computer system and the local time of the second computer system;

timestamping files created or modified by the first computer system using the local time of the first computer system when storing the files created or modified by the first computer system on the first computer system; and applying the calculated difference to the local time of the first computer system when the files created or modified by the first computer system are being stored on the second computer system by applying the time delta to the local time of the second computer system when applying the difference to the local time of the first computer system such that the files created or modified by the first computer system are timestamped using the local time of the second computer system.

2. The method of claim 1 wherein the local time provided by the second computer system includes an Epoch.

3. The method of claim 2 wherein the local time provided by the second computer system is in a form of a timestamp.

4. A computer program product on a computer readable medium for relating a local time of a first computer system to a local time of a second computer system in order to timestamp files created or modified by the first computer system that are to be stored on the second computer system using the local time of the second computer system, the computer program product comprising:

code means for requesting by said first computer system that said second computer system provide the local time at the second location;

code means for receiving by said first computer system the returned local time provided by said second computer system;

code means for determining whether there is a difference between the local time of the first computer system and the local time of the second computer system;

code means for calculating the difference between the local time of the first computer system and the local time of the second computer system in response to determining that there is a difference between the local time of the first computer system and the local time of the second computer system wherein calculating the difference between the local time of the first computer system and the local time of the second computer system includes computing a time delta between the local time of the first computer system and the local time of the second computer system;

code means for timestamping files created or modified by the first computer system using the local time of the first computer system when storing the files created or modified by the first computer system on the first computer system; and code means for applying the calculated difference to the local time of the first computer system when the files created or modified by the first computer system are being stored on the second computer system by applying the time delta to the local time of the second computer system when applying the difference to the local time of the first computer system such that the files created or modified by the first computer system are timestamped using the local time of the second computer system.

5. The computer program product of claim 4 wherein the local time provided by the second computer system includes an Epoch.

6. The computer program product of claim 5 wherein the local time provided by the second computer system is in a form of a timestamp.

7. An apparatus for relating a local time of a first computer system to a local time of a second computer system in order to timestamp files created or modified by the first computer system that are to be stored on the second computer system using the local time of the second computer system, the apparatus comprising:

means for requesting by said first computer system that said second computer system provide the local time at the second location;

means for receiving by said first computer system the returned local time provided by said second computer system;

means for determining whether there is a difference between the local time of the first computer system and the local time of the second computer system;

means for calculating the difference between the local time of the first computer system and the local time of the second computer system in response to determining that there is a difference between the local time of the first computer system and the local time of the second computer system wherein calculating the difference between the local time of the first computer system and the local time of the second computer system includes computing a time delta between the local time of the first computer system and the local time of the second computer system;

means for timestamping files created or modified by the first computer system using the local time of the first computer system when storing the files created or modified by the first computer system on the first computer system; and means for applying the calculated difference to the local time of the first computer system when the files created or modified by the first computer system are being stored on the second computer system by applying the time delta to the local time of the second computer system when applying the difference to the local time of the first computer system such that the files created or modified by the first computer system are timestamped using the local time of the second computer system.

8. The apparatus of claim 7 wherein the local time provided by the second computer system includes an Epoch.

9. The apparatus of claim 8 wherein the local time provided by the second computer system is in a form of a timestamp.

10. A first computer system for relating a local time kept therein to a local time of a second computer system in order to timestamp files created or modified by the first computer system that are to be stored on the second computer system using the local time of the second computer system, the first computer system comprising:

at least a storage device for storing code data; and at least one processor for processing the code data to request that said second computer system provide the local time at the second location, to receive the provided local time to determine whether there is a difference between the local time of the first computer system and the local time of the second computer system, to calculate the difference between the local time of the first computer system and the local time of the second computer system in response to determining that there is a difference between the local time of the first computer system and the local time of the second computer system wherein to calculate the difference between the local time of the first computer system and the local time of the second computer system includes computing a time delta between the local time of the first computer system and the local time of the second computer system, to timestamp files created or modified by the first computer system using the local time of the first computer system when storing the files created or modified by the first computer system on the first computer system, and to apply the calculated difference to the local time of the first computer system when the files created or modified by the first computer system are being stored on the second computer system by applying the time delta to the local time of the second computer system when applying the difference to the local time of the first computer system such that the files created or modified by the first computer system are timestamped using the local time of the second computer system.

11. The first computer system of claim 10 wherein the local time provided by the second computer system includes an Epoch.

12. The first computer system of claim 11 wherein the local time provided by the second computer system is in a form of a timestamp.

* * * * *